US012780053B2

(12) United States Patent
Timon et al.

(10) Patent No.: US 12,780,053 B2
(45) Date of Patent: Nov. 3, 2026

(54) CONTROL SYSTEM FOR LOCKING DEVICES FOR A VEHICLE SEAT, TRACK MECHANISM, AND VEHICLE SEAT ASSEMBLY

(71) Applicant: FAURECIA Sièges d'Automobile, Nanterre (FR)

(72) Inventors: Michel Timon, Le Vey (FR); Fabrice Petit, Saint Georges des Groseillers (FR); Vincent Nardin, Flers (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 118 days.

(21) Appl. No.: 18/541,980

(22) Filed: Dec. 15, 2023

(65) Prior Publication Data

US 2024/0198865 A1 Jun. 20, 2024

(30) Foreign Application Priority Data

Dec. 16, 2022 (FR) ....................................... 2213496

(51) Int. Cl.
*B60N 2/08* (2006.01)

(52) U.S. Cl.
CPC ......... *B60N 2/0818* (2013.01); *B60N 2/0843* (2013.01); *B60N 2/0887* (2013.01)

(58) Field of Classification Search
CPC .. B60N 2/0887; B60N 2/0818; B60N 2/0806; B60N 2/0875; B60N 2/0843
See application file for complete search history.

(56) References Cited

U.S. PATENT DOCUMENTS

| | | | | |
|---|---|---|---|---|
| 5,348,373 A | 9/1994 | Stiennon | | |
| 6,457,775 B2 | 10/2002 | Timon | | |
| 9,050,908 B2 | 6/2015 | Speck | | |
| 9,272,639 B2 | 3/2016 | Lee | | |
| 9,393,890 B2 * | 7/2016 | Phinney | ............ | B60N 2/01516 |
| 9,676,298 B2 | 6/2017 | Beneker | | |
| 10,065,531 B2 | 9/2018 | Ferre | | |
| 2017/0225592 A1 | 8/2017 | Ferre | | |
| 2021/0347282 A1 | 11/2021 | Bozintan | | |

FOREIGN PATENT DOCUMENTS

| | | | | |
|---|---|---|---|---|
| CN | 207106248 U | 3/2018 | | |
| FR | 3037009 A1 | 12/2016 | | |
| JP | 2006347516 A | 12/2006 | | |
| KR | 970000523 B1 | 1/1997 | | |
| WO | WO-2018187054 A1 * | 10/2018 | ......... | B64D 11/0648 |

OTHER PUBLICATIONS

Great Britain Search for GB2319005.1 dated Jun. 12, 2024, 3 pages.

* cited by examiner

*Primary Examiner* — Milton Nelson, Jr.
(74) *Attorney, Agent, or Firm* — Barnes & Thornburg LLP

(57) ABSTRACT

A control system for locking devices for vehicle seats comprising a chassis and an element mobile along a straight direction relative to the chassis and a first pivoting arm. A first end of the first pivoting arm is fixed to the mobile element of the linear actuator. A second end of the first pivoting arm is adapted to push, respectively pull, a first pin of a first locking device when the mobile element of the linear actuator is moved relative to the chassis, in order to control locking or unlocking of the first locking device.

15 Claims, 8 Drawing Sheets

Figure 1:
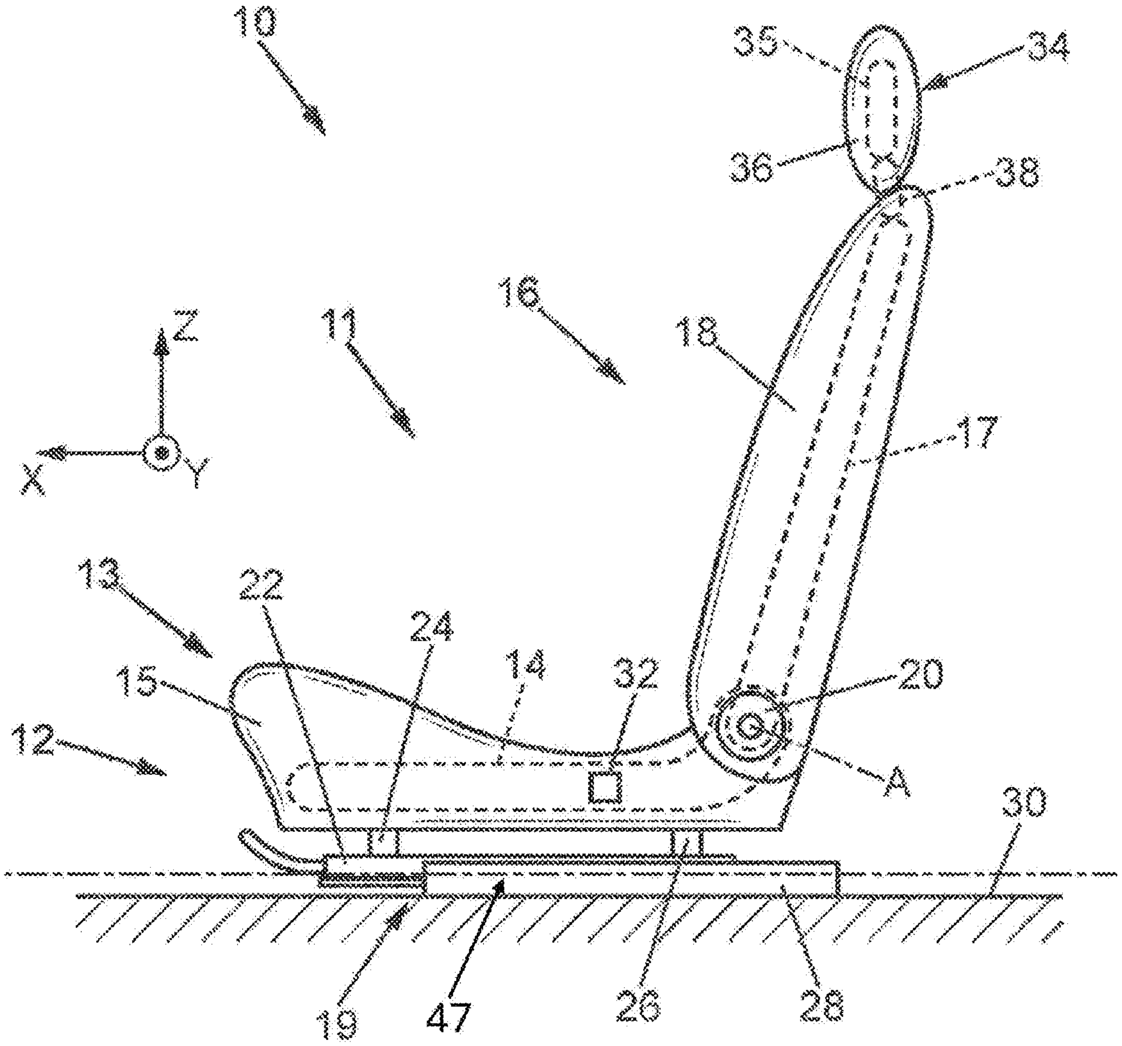

CONTROL SYSTEM FOR LOCKING DEVICES FOR A VEHICLE SEAT, TRACK MECHANISM, AND VEHICLE SEAT ASSEMBLY

PRIORITY CLAIM

This application claims priority to French Patent Application FR2213496, field Dec. 16, 2022, which is expressly incorporated by reference herein.

BACKGROUND

The present disclosure relates to a control system for locking devices for a vehicle seat. The present disclosure relates, in particular, to a control system for locking devices for a vehicle seat track, a track mechanism for vehicle seats and a vehicle seat assembly.

SUMMARY

According to the present disclosure, a control system for locking devices for vehicle seats, in particular locking devices for vehicle seat tracks, where the control system comprises:

- a linear actuator comprising a chassis and an element mobile along a straight direction relative to the chassis; and
- a first pivoting arm, where a first end of the first pivoting arm is fixed to the mobile element of the linear actuator, and a second end of the first pivoting arm is adapted to push, respectively pull, a first pin of a first locking device when the mobile element of the linear actuator is moved relative to the chassis, in order to control locking or unlocking of the first locking device.

In illustrative embodiments, the control system is independent of the locking devices that it controls. It is thus possible to use any locking device suited for being controlled by action on a pin. Such devices may have a greater mechanical strength than comparative levers and/or provide a greater security for locking/unlocking. The assembly of the control system is also made easier.

In illustrative embodiments, the control system may comprise one or more of the following characteristics taken alone or in combination:

- the control system may comprise a second pivoting arm, where a first end of the second pivoting arm is fixed to the chassis of the linear actuator or to a second element mobile along the straight direction relative to the chassis, and a second end of the second pivoting arm is adapted to push, respectively pull, a second pin of a second locking device when the mobile element or the second mobile element 154 is/are moved relative to the chassis, in order to control locking or unlocking of the second locking device;
- the first and second pivoting arms are each arranged on one respective side of the linear actuators;
- the control system further comprises control means for the linear actuator;
- the control means of the linear actuator comprise a button; and
- the control means of the linear actuator comprise a position sensor.

In illustrative embodiments, a track mechanism is proposed for a vehicle seat, comprising:

- a first track comprising a first rail mobile relative to a first fixed rail;

- a second track comprising a second rail mobile relative to a second fixed rail;
- a first locking device for the translation of the first mobile rail relative to the first fixed rail, where the first locking device comprises a first pin controlling a locking or unlocking of the first locking device;
- a second locking device for the translation of the second mobile rail relative to the second fixed rail, where the second locking device comprises a second pin controlling a locking or unlocking of the second locking device;
- a control system such as described above in all combinations thereof, where the control system is suited for moving the first and second pivoting arms concomitantly so that the second end of the first pivoting arm pushes, respectively pulls, the first pin of the first locking device in order to control locking or unlocking of the first locking device and the second end of the second pivoting arm pushes, respectively pulls, the second pin of the second locking device in order to control locking or unlocking of the second locking device.

In illustrative embodiments, the control system is suited for moving the first and second pivoting arms concomitantly such that:

- the second end of the first pivoting arm pushes the first pin of the first locking device when the linear actuator pulls on the first end of the first arm; and
- the second end of the second pivoting arm pushes the second pin of the second locking device when the linear actuator pulls on the first end of the second arm.

In illustrative embodiments, the track mechanism may comprise a first play between the second end of the first pivoting arm and the first pin of the first locking device and/or a second play between the second end of the second pivoting arm and the second pin of the second locking device, where the first play and/or the second play are preferably included between 1 mm and 2 mm.

In illustrative embodiments, the first pin is elastically constrained, in particular by means of a first spring, into a locked position of the translation of the first mobile rail relative to the first fixed rail, where the first pivoting arm is suited for moving the first pin into a locked position of the translation of the first mobile rail relative to the first fixed rail, against the elastic stress experienced by the first pin and/or the second pin is elastically constrained, in particular by means of a second spring, into a locked position of the translation of the second mobile rail relative to the second fixed rail, where the second pivoting arm is suited for moving the second pin into an unlocked position for the translation of the second mobile rail relative to the second fixed rail, against the elastic stress experienced by the second pin.

In illustrative embodiments, a vehicle seat assembly is proposed comprising an automotive vehicle seat with a vehicle seat bottom and a track mechanism such as described above, in all combinations thereof, where the seat bottom of the vehicle seat is fixed to the first and second mobile rails.

In illustrative embodiments, the first pivoting arm may be mounted pivoting around a first axis of rotation, where the first end and/or the second end of the first pivoting arm is arranged vertically below the first axis of rotation; and/or the second pivoting arm may be mounted pivoting around a second axis of rotation, where the first end and/or the second end of the second pivoting arm is arranged vertically below the second axis of rotation.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 schematically shows a vehicle seat assembly in side view.

Figure 2:
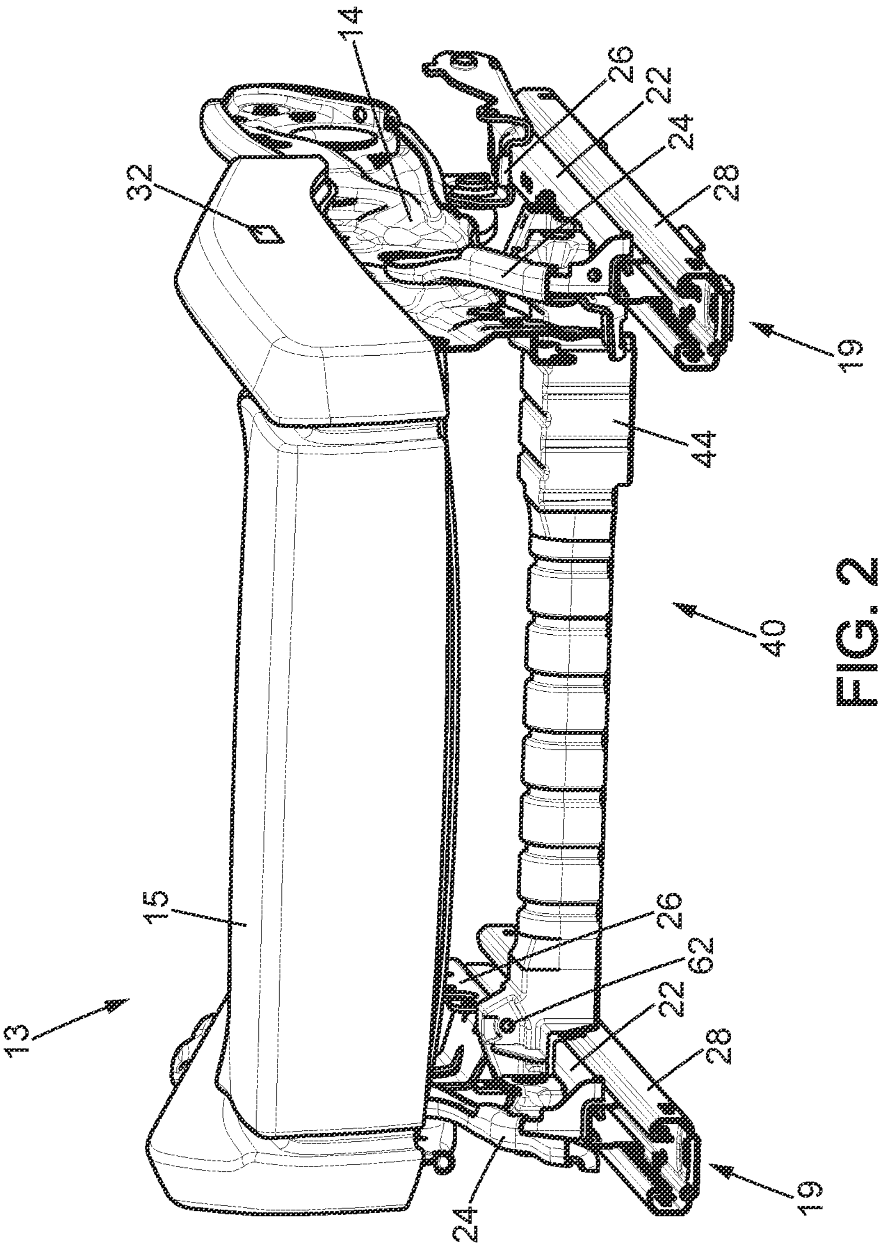

FIG. 2 schematically shows in perspective, a detail of the vehicle seat assembly from FIG. 1.

Figure 3:
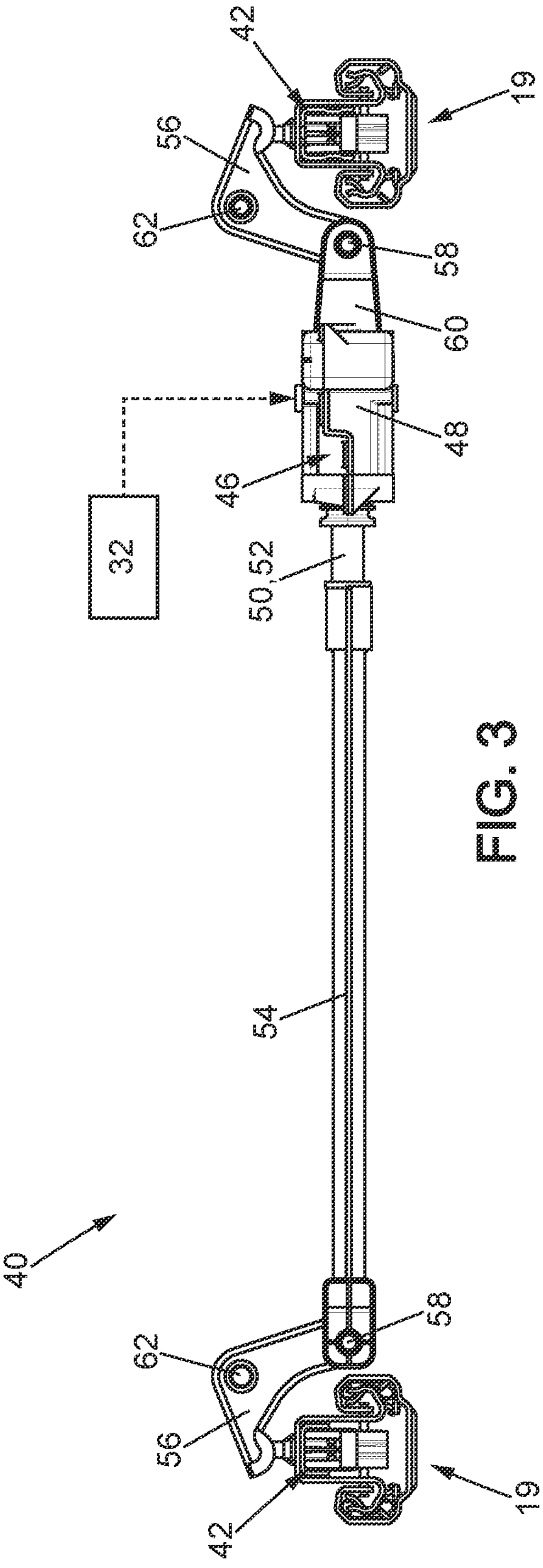

FIG. 3 schematically shows a track mechanism which can be implemented in the seat assembly from FIG. 1 in locked position of the tracks.

Figure 4:
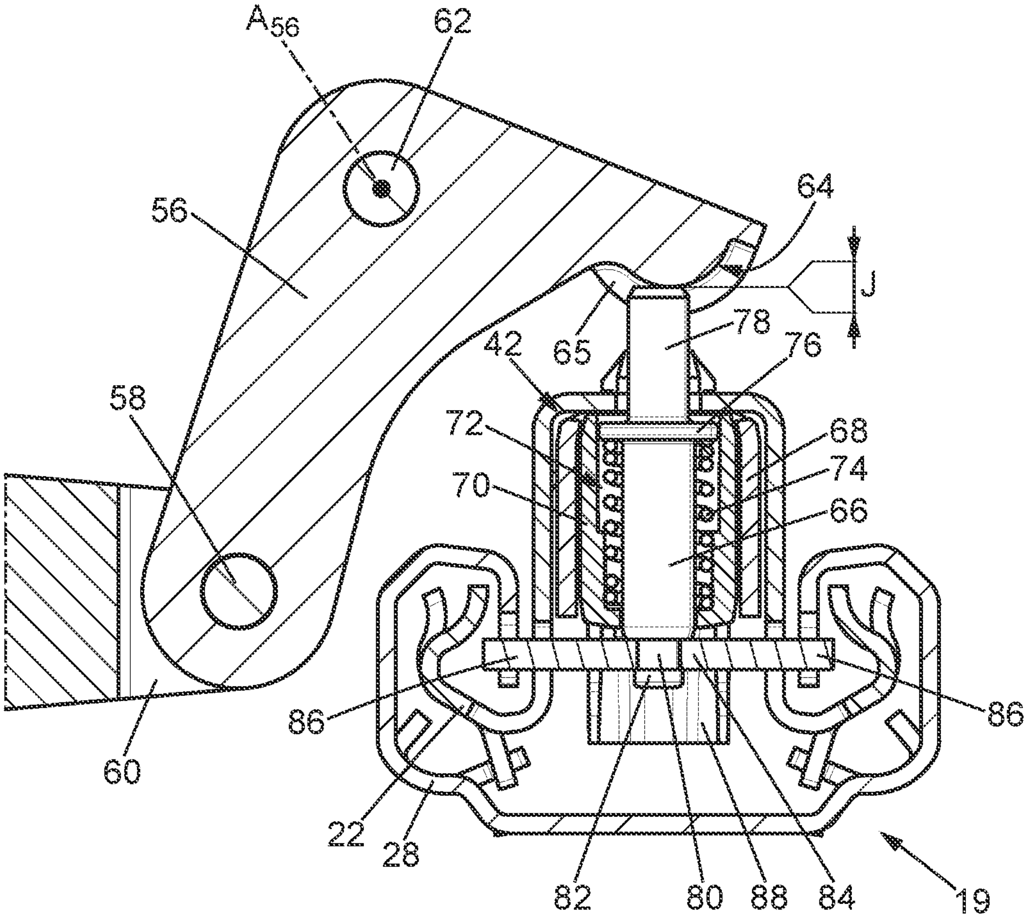

FIG. 4 schematically shows in section a detail of the track mechanism from FIG. 3.

Figure 5:
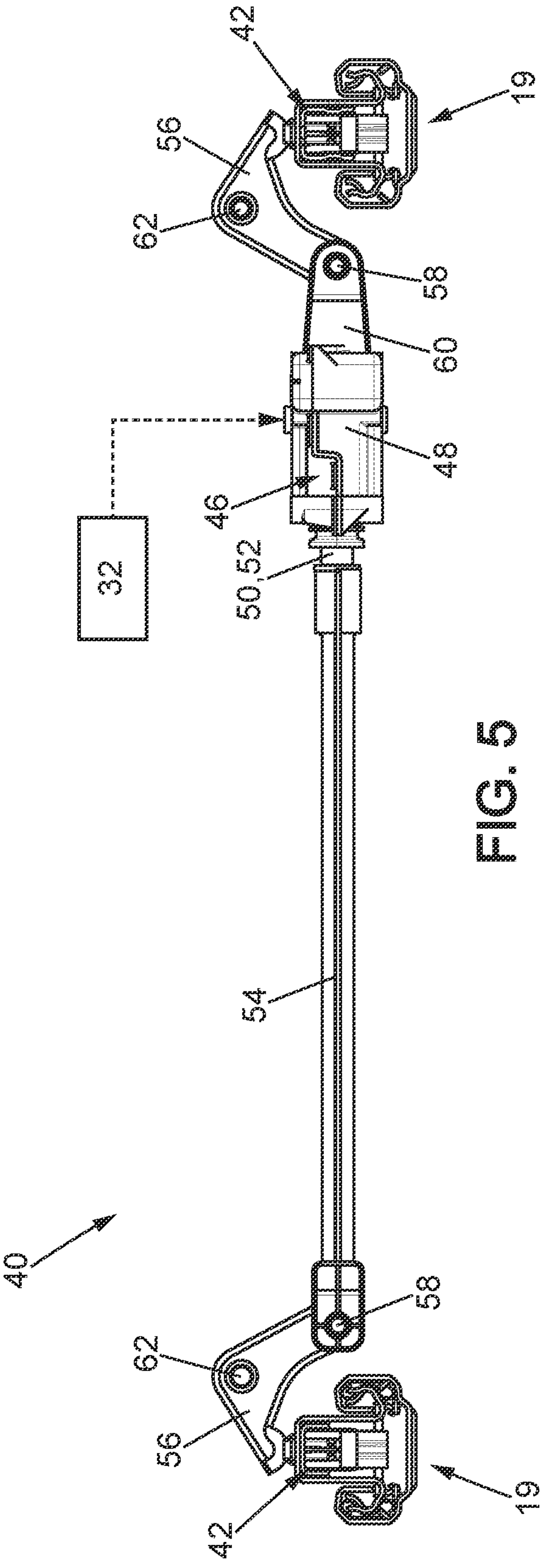

FIG. 5 is a view analogous to FIG. 3, where the track mechanism is in a position of unlocking the tracks.

Figure 6:
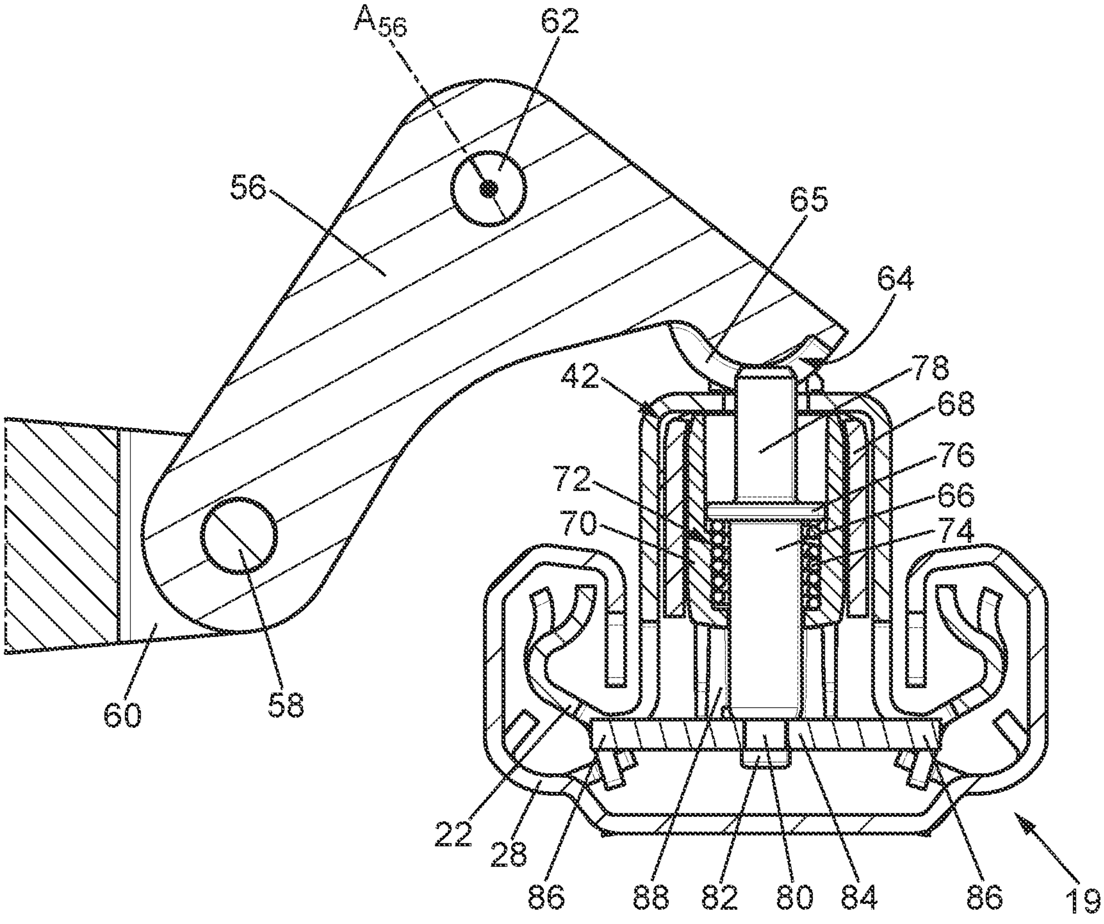

FIG. 6 schematically shows in section a detail of the track mechanism from FIG. 5.

Figure 7:
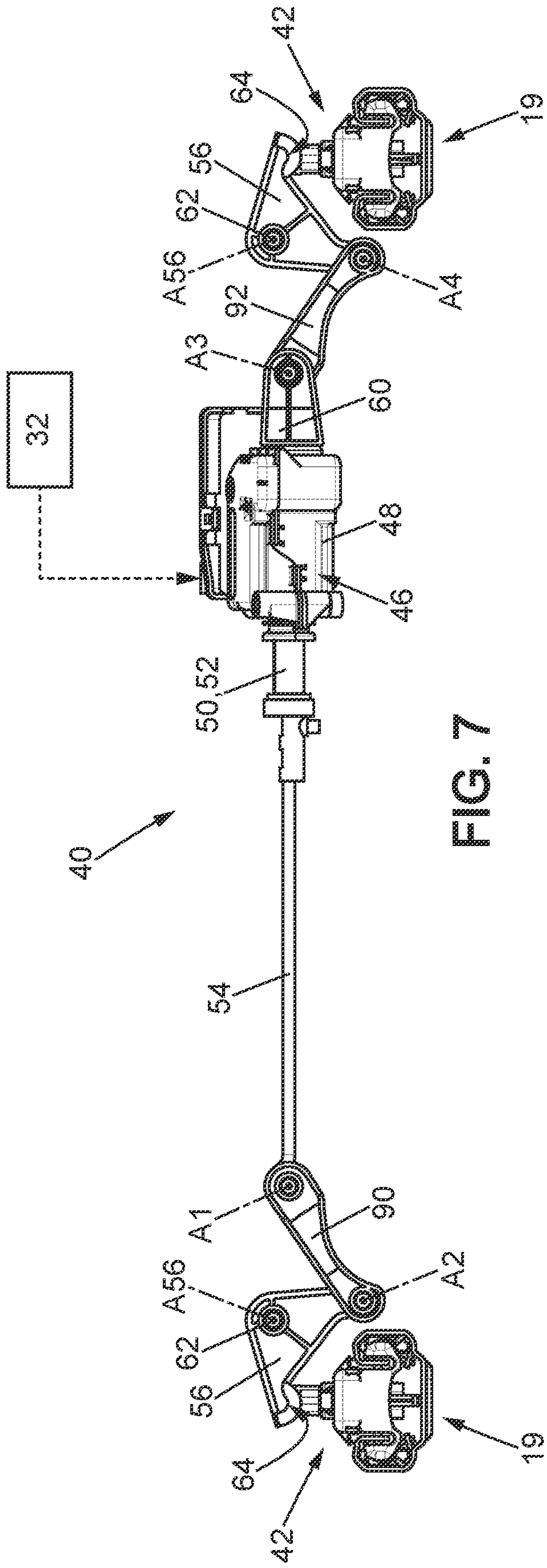

FIG. 7 schematically shows a view analogous to FIG. 3 of a variant track mechanism in a position locking the tracks.

Figure 8:
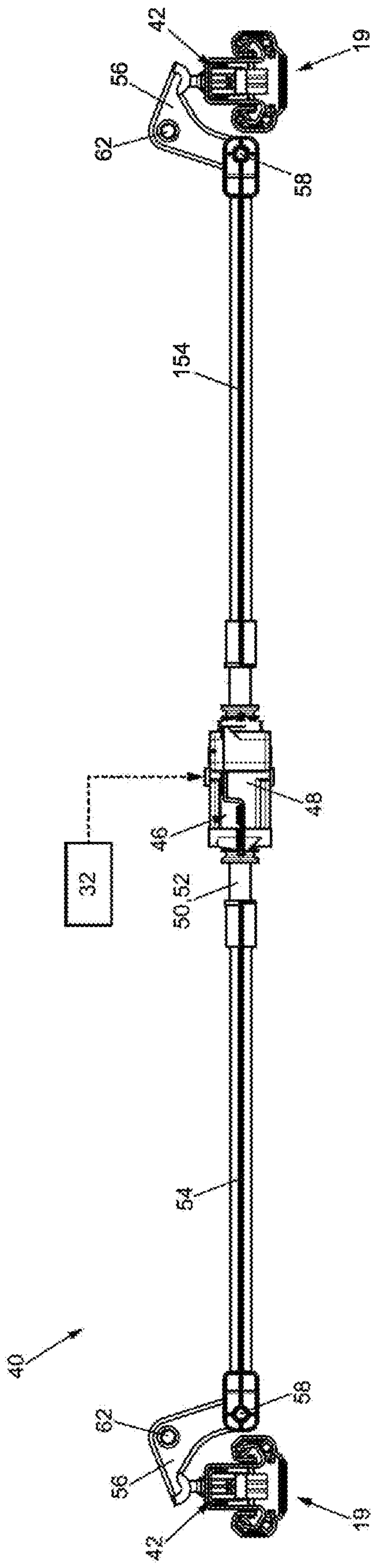

FIG. 8 schematically shows a view analogous to FIG. 3 of a further variant track mechanism in a position locking the tracks.

DETAILED DESCRIPTION

In the various figures, the same references designate identical or similar items. In the interest of conciseness, only the elements, which are useful for understanding the embodiment described, are shown on the figures and are described in detail in the following.

In the following description, when referring to absolute position qualifiers, such as the terms "front," "rear," "top," "bottom," "left," "right," etc., or relatives such as the terms "above," "below,", "upper," "lower," etc. or orientation qualifiers, such as "horizontal," "vertical," etc., unless indicated otherwise refer to the orientation of the figures or of a seat in the normal position of use thereof.

In particular, the longitudinal direction X extends in the longitudinal direction of the seat. The longitudinal direction of the seat is considered to be the same as the longitudinal direction of the automotive vehicle in which the seat is mounted. This longitudinal direction X corresponds to the normal direction of forward motion of the vehicle. The longitudinal direction X is horizontal. The transverse direction Y of the seat thus corresponds to the transverse or lateral direction of the automotive vehicle. This transverse direction corresponds to a direction perpendicular to the normal direction of forward motion of the vehicle. The transverse direction Y is horizontal. Finally, the vertical direction Z is a vertical direction of the seat, perpendicular to the longitudinal and transverse directions.

FIG. 1 schematically represents an automotive vehicle seat assembly 10, comprising a vehicle seat 11, and a track mechanism 12, where the seat 11 is mounted on the track mechanism 12.

The seat 11 comprises a seat bottom 13, with a seat bottom framework 14 and seat bottom padding 15 on which a seatback 16 is mounted, which comprises a seatback framework 17 and a seatback padding 18. The seatback framework 17 here pivots around an axis A, relative to the seat bottom framework 14. In order to do that, a hinge mechanism 20 is arranged between the seat bottom framework 14 and the seatback framework 17. The axis A is for example substantially parallel to the transverse direction Y.

The seat bottom 13 is mounted on mobile profiles 22, also called slides or male profiles, by means of feet 24, 26. Each mobile profile 22 is associated with a fixed profile 28 in order to form a track 19. The fixed profile 28 is also called rail or female profile. The fixed profile 28 is fixed to the floor 30 of an automotive vehicle. The fixed 28 and mobile 22 profiles of the tracks 19 may be made of metal.

In this example, the seat 11 comprises a manual control element 32 for locking/unlocking the tracks 19. In that way, this control element 32 serves to lock and unlock the locking devices 42 of the sliding of the mobile profiles 22 relative to the respective fixed profiles 28. Once the locking devices 42 are unlocked, the occupant of the seat may slide the mobile profiles 22 relative to the respective fixed profiles 28 of the tracks 19, in the longitudinal direction X of the tracks 19. To do that, the occupant may in particular pull or push the seat bottom 13 or the seatback 16.

Alternatively, the movement of the mobile profiles 22 relative to the fixed profiles 28 is controlled by means of an actuator. One or more control buttons for that actuator may then be provided on the seat 11 in particular on the seat bottom 13. In this case, the buttons command, in a first step, unlocking of the locking devices 42, and then a movement of each of the mobile profiles 22 relative to the associated fixed profile 28.

The seat 11 also comprises a headrest 34. The headrest 34 comprises a headrest framework 35 and a headrest padding 36. The headrest framework 35 is connected to the seatback framework 17 by means of at least one headrest attachment rod 38, preferably two headrest attachment rods 38. The one or more headrests attachment rods 38 may have variable length in order to allow a height adjustment of the position of the headrests 34. Alternatively or additionally, the headrest framework 35 is mobile relative to the one or more headrest attachment rods 38 in order to allow this height adjustment of the headrest position 34. The headrest padding 36 and/or the seatback padding 18 may cover all or part of the headrest attachment rods 38, for example in order to improve the appearance of the vehicle seat 11.

In the following, a control system 40 for the locking devices 42 of the tracks 19 of the vehicle seat 11 is described in more detail with reference to FIGS. 2 to 6.

FIG. 2 shows the seat bottom 13 of the seat 11 from FIG. 1 whose seat bottom framework 14 is fixed to the two tracks 19. As can be seen in this FIG. 2, a control system 40 for the locking devices 42 of the tracks 19 is provided and here it extends mostly between the two tracks 19. On this FIG. 2, only the cover 44 of this control system 40 is visible. Here, the cover 44 is fixed on each of the mobile profiles 22 of the tracks 19. Alternatively or additionally, the cover 44 may be fixed to one of the feet 24, 26 of the seat 11 or to the seat bottom framework 14 of the seat 11.

FIG. 3 shows a frontal view of the control system 40 fixed on the tracks 19 with the cover 44 of the control system 40 not shown. As shown in FIG. 3, the control system 40 first comprises a linear actuator 46. The linear actuator 46 comprises for example a motor, not shown on the figures, driving a reduction gear, also not shown on the figures. The motor and the reduction gear are for example received in a case 48 forming a chassis for the linear actuator 46. An output pinion of the reduction gear may engage with a screw 50, in particular an endless screw, only the end 52 of which can be seen in FIG. 3. The screw 50 is thus rotated relative to a nut fixed on the case 48 or formed by the case 48, such that rotation of the screw 50 caused by running the motor, accompanies a movement of the linear actuator 46 along a straight line relative to the case 48. As can be seen in FIG. 3, here the straight direction is parallel to the transverse direction Y. As an alternative to the screw 50 and the nut, the motor may drive a gear which engages a rack. Still other solutions are accessible to the person skilled in the art.

The end 52 of the screw 50 is fixed to a rod 54. As shown in FIG. 3, the rod 54 also extends parallel to the transverse direction Y. The rod 54 is fixed, at the end thereof opposite the end 52 of the screw 50, to a first pivoting arm 56. A pin 58 here connects the end of the rod 54 and the first pivoting arm 56, such that the first pivoting arm 56 can pivot relative to the end of the rod 54. As shown, the pivoting arm 56 can pivot relative to the end of the rod 54, around an axis parallel to the longitudinal direction X, in case of movement of the rod 54 relative to the case 48 of the linear actuator 46.

Further, an arm 60 is fixed on the case 48 or is formed by the case 48, on the side opposite the end 52 of the screw 50. The arm 60 is fixed, at its end opposite the case 48, to a second pivoting arm 56. A pin 58 here connects the end of the arm 60 and the second pivoting arm 56, such that the second pivoting arm 56 can pivot relative to the end of the arm 60, in case of movement of the screw 50 relative to the case 48 of the linear actuator 46. As shown, the second pivoting arm 56 can pivot relative to the end of the arm 60, around an axis parallel to the longitudinal direction X, in case of movement of the screw 50 relative to the case 48 of the linear actuator 46.

Each pivoting arm 56 is mounted freely in rotation around a respective axis A56. In order to do this, here, each pivoting arm 56 is fixed on the cover 44, where a cylindrical relief 62 of the cover 44 is received in a housing or a hole of the pivoting arm 56, of complementary section. More generally, each pivoting arm 56 is fixed to a respective mobile rail 22 of the track mechanism 12, via a part allowing rotation of the pivoting arm 56 relative to the mobile rail 22. Alternatively or additionally, each pivoting arm is fixed to a respective foot 24, 26 and/or to the seat bottom framework 14. Each axis A56 is parallel to the longitudinal direction X.

Each pivoting arm 56 has one end 64 suited for engaging with one end of a pin 66 of a respective locking device 42. Here, the end 64 is formed by a recess between two bands 65. The end 64 here has the shape of a cylindrical angular portion, where the cylinder has a circular transverse section.

Referring to FIG. 4, a locking device 42 is described in more detail below. Each locking device 42 is here fixed on a mobile rail 22 of a track 19. More precisely, a support 68, which is part of the locking device 42, is fixed on the mobile rail 22. For example, the support 68 is riveted to the mobile rail 22. Other means of attachment to the mobile rail 22 are however possible. A case 70 is fixed onto the support 68. Here, as an example, the case 70 is elastically nested on the support 68. The case 70 in particular defines a housing 72, receiving a spring 74 and a portion of the pin 66. The spring 74 extends between the crown 76 of the pin 66 and the shoulder in the housing 72. The spring 74 elastically constrains the pin 66, here in a locking position of the slider 19. Here, the spring 74 elastically constrains the pin 66 of vertically upwards.

In the locking position of the track, shown in FIG. 4, a portion 78 of the pin 66 extends beyond the housing 72 into the case 70, towards the end 64 of the pivoting arm 56. However, a play j is preferably maintained between the end of the pin 66 and the end 64 of the pivoting arm 56 intended to engage with the pin 66. Such play in particular allows mounting of the control device 40 on various track mechanisms 12, despite dimensional deviations related to production methods. The play j is for example between 1 mm and 2 mm. The play j is for example 1.5 mm.

The pin 66 additionally forms, at the end thereof opposite the upper portion 78, a throat 80 and a tip 82, allowing attachment of a plate 84. The plate 84 here defines claws 86 (or teeth) intended to be received in the corresponding slots of the mobile 22 and fixed 28 rails in order to prevent sliding of the mobile rail 22 relative to the fixed rail 28. For example, the plate 84 defines three claws 86 extending towards the first side of the mobile 22 and fixed 28 rails, and three other claws 86 extending towards the second side of the mobile 22 and fixed 28 rails. In that way, the plate 84 may have the shape of a double comb.

As can be seen in FIG. 4 in locked position of the tracks 19, the pivoting arms 56 are here held away from the pin 66. In that way, the springs 74 elastically constrain the pin 66 in a position in which the claws 86 of the plate 84 are received in the slits of the mobile 22 and fixed 28 rails. The sliding of the mobile rail 22 relative to the fixed rail 28 is in that way blocked.

It should be noted that in this locked position shown in FIG. 4, the axis A56 of rotation of the pivoting arm 56 is arranged vertically above a pin 58 for connection with the arm 60 or the rod 54, on the one hand, and the end 64 of the pivoting arm 56 intended to engage with the pin 66, on the other hand. In that way, in case of frontal impact of the vehicle equipped with seat 10, the seat bottom 13 has a tendency to dive down, meaning to move and/or to deform downward. However, in this case, the seat bottom 13 is going to come to a stop against the pivoting arms 56 but without pivoting them so as to command an unlocking of the tracks 19. In that way, the tracks 19 are held locked, despite the movement and/or the deformation the seat bottom 13. The safety of the occupant of the seat 11 is thereby improved.

As can be seen in FIG. 5 showing the unlocked position of the tracks 19, this unlocked position is here reached by pulling on the pivoting arms 56, in particular on the first ends of the pivoting arms 56, one towards the other. In order to do that, a movement of the end 52 of the screw 50, fixed to the rod 54, is commanded towards the inside of the case 48. Here, this movement of the screw 50 is accompanied by a lifting of the case 48 which is attached solely to:

- the rod 54, via the screw 50, of the gear and motor, on the one hand; and
- the second pivoting arm 56, via the arm 60, on the other.

Because the pivoting of the pivoting arms 56, each of them pushes on the associated pin 66, against the elastic force of the spring 74 pushing the pin 66 towards the locked position thereof of the track 19. Pressing the pin 66 into the box 70 is accompanied by a movement of the plate 84, until the claws 86 come out of the slots in the mobile 22 and fixed 28 rails. The sliding of the mobile rail 22 relative to the fixed rail 28 is then released. It should be noted that the movement of the plate 84 between the locked position and the unlocked position may be guided by the case 70. In particular, the case 70 may form two tabs 88 guiding the plate 84.

Once the command for actuation of the motor of the linear actuator 46 is interrupted, for example by releasing the command element 32, the spring 74 pushes the pins 66 back into the positions thereof for locking the tracks 19. The springs 74 may also push back the rod 54 and the screw 50. Alternatively or additionally, a movement of the screw 50 towards the outside of the case 48 of the linear actuator 46 can be ordered by means of the motor therefore.

FIG. 7 shows a second example of a control device 40.

The second example of a command device 40 is different from the first example of a command device 40 described in that the rod 54 and the arm 60 fixed to the case 48 or formed by the case 48 are not fixed to the pivoting arms 56, but are indirectly connected to the pivoting arms 56, via respective connecting rods 90, 92.

In that way, a first connecting rod 90 connects the rod 54 to the associated pivoting arm 56. At one first end, the first connecting rod 90 is mounted pivoting relative to the rod 54 around a first axis of rotation A1. Here, the first axis of rotation A1 is parallel to the direction of extension of the tracks 19 corresponding to the longitudinal direction X. For example, a cylindrical pin with circular section is received in a housing with complementary section, in the first control rod 90 and in the rod 54. At one second end, the first connecting rod 90 is mounted pivoting relative to the associated pivoting arm 56 around a second axis of rotation A2. Here, the second axis of rotation A2 is parallel to the direction of extension of the tracks 19 corresponding to the longitudinal direction X. For example, a cylindrical pin with circular section is received in a housing with complementary section, in the first control rod 90 and in the pivoting arm 56.

Analogously, a second control rod 92 connects the arm 60, fixed on the case 48 or formed by the case 48, to the associated pivoting arm 56. At one first end, the second connecting rod 90 is mounted pivoting relative to the arm 60 around a third axis of rotation A3. Here, the third axis of rotation A3 is parallel to the direction of extension of the tracks 19 corresponding to the longitudinal direction X. For example, a cylindrical pin with circular section is received in a housing with complementary section, in the first control rod 92 and in the pivoting arm 60. At one second end, the first connecting rod 92 is mounted pivoting relative to the associated pivoting arm 56 around a second axis of rotation A4. Here, the third axis of rotation A4 is parallel to the direction of extension of the tracks 19 corresponding to the longitudinal direction X. For example, a cylindrical pin with circular section is received in a housing with complementary section, in the first control rod 92 and in the pivoting arm 56.

The control device 40 according to the second example from FIG. 7 may be particularly suited to the environments under the seat which are particularly demanding, not allowing, in particular, the use of a straight rod 54 extending directly between the linear actuator 46 and the associated pivoting arm 56. The link by a connecting rod 90 may in particular make it possible to avoid an obstacle located between the end of the rod 54 and the associated pivoting arm 56.

As can be seen in FIG. 7, the axis A56 of rotation of the pivoting arms 56 is arranged vertically above each of the first, second, third and fourth axes of rotation A1, A2, A3, A4 in particular above the second and fourth axes of rotation A2, A4. Similarly, as is also visible in FIG. 7, the ends 64 of the pivoting arms 56 in contact with the pins 66 of the locking devices 42 are arranged vertically above each of the first, second, third and fourth axes of rotation A1, A2, A3, A4 in particular above the second and fourth axes of rotation A2, A4. In that way, in case of impact, a deformation of the seat assembly 10 tending to cause a bearing on the control device 40 from the top of the control device 40 does not tend to cause, at least initially, an opening of the locking devices 42 for the tracks 19. Further, the second and fourth axes of rotation A2, A4 are here arranged vertically below the first and third axis of rotation A1, A3.

The present disclosure is not limited to just the examples described solely for information, but it encompasses all the variations which could be conceived by the person skilled in the art in the context of the protection sought.

In the examples described, the linear actuator 46, in particular the motor of the linear actuator 46, is controlled by means of a button 32. Alternatively or additionally, the actuator 46, in particular the motor of the linear actuator 46, is controlled by means of a position sensor 47. The seat 11 can thus be moved to a prestored position, referenced by the position sensor 47 on the fixed rail 28. Such a linear actuator control 46 is in particular useful when the seat assembly 10 has an easy entry position in which the seat 11 is moved forward, and where the seatback 16 could be pivoted for increasing the space behind the seat 11 in the easy entry position. The linear actuator 46 may also be controlled as a function of a pivoting of the seatback 16 of the seat 11, for example in order to command a movement of the seat longitudinally forward in the passenger compartment, in order to reach an easy entry position.

Further, the return of the command system 40 into the position may be obtained by one or more springs each acting on a respective pivoting arm 56. The pivoting of the pivoting arms 56 so as to move the pins 66 is then done against the stress produced by these restoring springs.

Also, in the examples described, the control system 40 controls a passage from the locked position to the unlocked position of the tracks 19 by pulling on the pivoting arms 56. Alternatively, however, the control system 40 controls a passage from the locked position to the unlocked position of the tracks 19 by pushing on the pivoting arms 56.

Further, here, the locking devices 42 are normally in locked position and the change of these locking devices 42 from a locked position to an unlocked position is controlled with the control system 40. Alternatively, however, the locking devices 42 are normally in unlocked position and the change of the locking devices 42 from an unlocked position to a locked position is controlled with the control system 40.

Finally, the control system 40 is used for controlling two locking devices 42 for tracks 19, simultaneously. However, such a control system 40 may be used for controlling a single locking device 42 or one or more locking devices of any lockable element of a vehicle seat.

As illustrated on FIG. 8, the linear actuator 46 can include a second mobile element 154, the second pivoting arm 56 being connected to the linear actuator 46 through the second mobile element 154. Especially, a first end of the second pivoting arm 56 is connected to the second mobile element 154 which is mobile along a straight direction relative to the case 48 of the linear actuator 46. A second end of the second pivoting arm 56 is adapted to push, respectively pull, a second pin of a second locking device when at least one among the mobile element 54 and the second mobile element 154 is moved relative to the case 48, in order to control locking or unlocking of the second locking device.

Mounting a vehicle seat on tracks may be done in order to adjust the longitudinal position of the vehicle seat in the passenger compartment. A comparative longitudinal position adjustment device for the vehicle seat may be driven by an electric motor. Alternatively, a comparative adjustment device for the longitudinal position of the vehicle seat may not have any electric motor at all. In this case, the comparative longitudinal position of the vehicle seat may be adjusted by the user by pulling or pushing the seat towards the front or towards the rear of the vehicle.

A comparative non-motorized longitudinal adjustment device comprises a separate locking device for each track. The comparative locking devices are normally in a track locking state. The comparative locking devices may be brought into an unlocked position of the tracks by means of a manual actuation device. The comparative actuation device may take the form of a beam, mounted rotatably around an axis perpendicular to the direction of extension of the tracks. In order to unlock the comparative locking devices, the user pulls on the beam in order to control pivoting thereof against an elastic force intended to keep the locking devices in a track locking state. Also, in order to avoid a deformation of the beam because of the forces exerted, the beam must be relatively massive. Further, the grasp for the beam, generally in the front of the vehicle seat under the seat bottom, is not ergonomic.

Further, a comparative adjustment device for the longitudinal position of the vehicle seat may be used. This comparative device comprises two tracks each of which comprises a fixed rail and a mobile rail. A respective comparative locking device, comprising a rotatably mounted unlocking device, is associated with each track, where one end of the lever is suited for locking the displacement of the fixed rail relative to the mobile rail. The two unlocking levers are moved concomitantly by means of a control device. The control device comprises a motor, and a gear driven by the motor and driving a rack in translation. The rack is connected to a rod rotationally mounted relative to a first unlocking lever. The motor, the gear and the rack are here mounted inside a case, forming an arm which is connected, freely in rotation, to the second unlocking lever. In that way, by commanding the rotation of the motor, a traction on the unlocking levers is controlled which, by pivoting, release the translation of each of the mobile rails relative to the associated fixed rail.

However, the comparative device has some fragility. For example, the locking of each track is provided by a simple lever, whose weight must remain low in order to be moved by the electric motor with reduced dimensions. Further, in case of frontal impact of the vehicle equipped with the device, the seat tends to dive, which may cause an unlocking of the tracks, and could lead to a particularly dangerous movement of the seat. Further, placement of the comparative control device is delicate. In particular, getting a good length of the assembly composed of the arm, the motor case and the rod, in order to assure a concomitant locking and unlocking of the two tracks, during actuation and cut off of the motor is delicate. A meticulous adjustment appears to be necessary which leads to a long assembly time. The mounting of the levers in the tracks also seems to be fastidious in the comparative device.

The present disclosure aims to improve the situation.

A control system is proposed for locking devices for vehicle seats, in particular locking devices for vehicle seat tracks, where the control system comprises:

- a linear actuator comprising a chassis and an element mobile along a straight direction relative to the chassis; and
- a first pivoting arm, where a first end of the first pivoting arm is fixed to the mobile element of the linear actuator, and a second end of the first pivoting arm is adapted to push, respectively pull, a first pin of a first locking device when the mobile element of the linear actuator is moved relative to the chassis, in order to control locking or unlocking of the first locking device.

In that way, advantageously, the control system is independent of the locking devices that it controls. It is thus possible to use any locking device suited for being controlled by action on a pin. Such devices may have a greater mechanical strength than the levers and/or provide a greater security for locking/unlocking. The assembly of the control system is also made easier.

According to preferred embodiments, the control system may comprise one or more of the following characteristics taken alone or in combination:

- the control system may comprise a second pivoting arm, where a first end of the second pivoting arm is fixed to the chassis of the linear actuator or to a second element mobile along the straight direction relative to the chassis, and a second end of the second pivoting arm is adapted to push, respectively pull, a second pin of a second locking device when the mobile element or the second mobile element 154 is/are moved relative to the chassis, in order to control locking or unlocking of the second locking device;
- the first and second pivoting arms are each arranged on one respective side of the linear actuators;
- the control system further comprises control means for the linear actuator;
- the control means of the linear actuator comprise a button; and
- the control means of the linear actuator comprise a position sensor.

According to another aspect, a track mechanism is proposed for a vehicle seat, comprising:

- a first track comprising a first rail mobile relative to a first fixed rail;
- a second track comprising a second rail mobile relative to a second fixed rail;
- a first locking device for the translation of the first mobile rail relative to the first fixed rail, where the first locking device comprises a first pin controlling a locking or unlocking of the first locking device;
- a second locking device for the translation of the second mobile rail relative to the second fixed rail, where the second locking device comprises a second pin controlling a locking or unlocking of the second locking device;
- a control system such as described above in all combinations thereof, where the control system is suited for moving the first and second pivoting arms concomitantly so that the second end of the first pivoting arm pushes, respectively pulls, the first pin of the first locking device in order to control locking or unlocking of the first locking device and the second end of the second pivoting arm pushes, respectively pulls, the second pin of the second locking device in order to control locking or unlocking of the second locking device.

Preferably, the control system is suited for moving the first and second pivoting arms concomitantly such that:

- the second end of the first pivoting arm pushes the first pin of the first locking device when the linear actuator pulls on the first end of the first arm; and
- the second end of the second pivoting arm pushes the second pin of the second locking device when the linear actuator pulls on the first end of the second arm.

The track mechanism may comprise a first play between the second end of the first pivoting arm and the first pin of the first locking device and/or a second play between the second end of the second pivoting arm and the second pin of the second locking device, where the first play and/or the second play are preferably included between 1 mm and 2 mm.

The first pin is elastically constrained, in particular by means of a first spring, into a locked position of the translation of the first mobile rail relative to the first fixed rail, where the first pivoting arm is suited for moving the first pin into a locked position of the translation of the first mobile rail relative to the first fixed rail, against the elastic stress experienced by the first pin and/or the second pin is elastically constrained, in particular by means of a second spring, into a locked position of the translation of the second mobile rail relative to the second fixed rail, where the second pivoting arm is suited for moving the second pin into an unlocked position for the translation of the second mobile rail relative to the second fixed rail, against the elastic stress experienced by the second pin.

According to another aspect, a vehicle seat assembly is proposed comprising an automotive vehicle seat with a vehicle seat bottom and a track mechanism such as described above, in all combinations thereof, where the seat bottom of the vehicle seat is fixed to the first and second mobile rails.

The first pivoting arm may be mounted pivoting around a first axis of rotation, where the first end and/or the second end of the first pivoting arm is arranged vertically below the first axis of rotation; and/or the second pivoting arm may be mounted pivoting around a second axis of rotation, where the first end and/or the second end of the second pivoting arm is arranged vertically below the second axis of rotation.

The invention claimed is:

1. A vehicle seat assembly comprising an automotive vehicle seat with a vehicle seat bottom and a track mechanism for the automotive vehicle seat comprising:
- a first track comprising a first rail mobile relative to a first fixed rail along a sliding direction;
- a second track comprising a second rail mobile relative to a second fixed rail along said sliding direction;
- a first locking device for locking the translation of the first mobile rail relative to the first fixed rail, where the first locking device comprises a first pin controlling a locking or unlocking of the first locking device;
- a second locking device for locking the translation of the second mobile rail relative to the second fixed rail, where the second locking device comprises a second pin controlling a locking or unlocking of the second locking device;
- a control system for vehicle seats for the locking devices, where the control system comprises:
- a linear actuator comprising a chassis and an element mobile along a straight direction relative to the chassis, said straight direction being perpendicular to the sliding direction;
- a first pivoting arm, where a first end of the first pivoting arm is connected to the mobile element of the linear actuator, and a second end of the first pivoting arm is adapted to push, respectively pull, the first pin of the first locking device when the mobile element of the linear actuator is moved relative to the chassis, in order to control locking or unlocking of the first locking device,
- a second pivoting arm, where a first end of the second pivoting arm is connected to one among the chassis of the linear actuator and a second element mobile along the straight direction relative to the chassis, and a second end of the second pivoting arm is adapted to push, respectively pull, a second pin of a second locking device when at least one among the mobile element and the second mobile element is moved relative to the chassis, in order to control locking or unlocking of the second locking device;
- the control system being suited for moving the first and second pivoting arms concomitantly so that the second end of the first pivoting arm pushes, respectively pulls, the first pin of the first locking device in order to control locking or unlocking of the first locking device and the second end of the second pivoting arm pushes, respectively pulls, the second pin of the second locking device in order to control locking or unlocking of the second locking device,
- where the seat bottom of the vehicle seat is fixed to the first and second mobile rails,
- wherein the first pivoting arm is mounted pivoting around a first axis of rotation, where the first end and the second end of the first pivoting arm are arranged vertically below the first axis of rotation.

2. The vehicle seat assembly of claim 1, wherein the first end of the first pivoting arm is fixed to the mobile element.

3. The vehicle seat assembly of claim 1, further comprising a first connecting rod mounted pivoting relative to the first end of the first pivoting arm, on a one side, and to an end of the mobile element, on another side.

4. The vehicle seat assembly of claim 1, wherein the second pivoting arm is mounted pivoting around a second axis of rotation, where the first end and/or the second end of the second pivoting arm is arranged vertically below the second axis of rotation.

5. The vehicle seat assembly of claim 1, wherein the first end of the second pivoting arm is attached to one among the chassis of the linear actuator and the second element mobile along the straight direction relative to the chassis.

6. The vehicle seat assembly of claim 1, comprising a second connecting rod mounted pivoting both relative to the first end of the second pivoting arm and relative to one among the chassis of the linear actuator and the second element mobile along the straight direction relative to the chassis.

7. The vehicle seat assembly of claim 1, wherein the first and second pivoting arms are each arranged on one respective side of the linear actuator.

8. The vehicle seat assembly of claim 1, further comprising means of control of the linear actuator.

9. The vehicle seat assembly of claim 8, wherein the means of control of the linear actuator comprises a button.

10. The vehicle seat assembly of claim 8, wherein the means of control of the linear actuator comprise a position sensor.

11. The vehicle seat assembly of claim 1, wherein the track mechanism comprises at least one among a first play between the second end of the first pivoting arm and the first pin of the first locking device and a second play between the second end of the second pivoting arm and the second pin of the second locking device.

12. The vehicle seat assembly of claim 11, where at least one among the first play and the second play is between 1 mm and 2 mm.

13. The vehicle seat assembly of claim 1, wherein the first track and the second track extend parallel to a longitudinal direction of the tracks, where the straight direction along which the mobile element of the linear actuator is mobile is perpendicular to the longitudinal direction of the tracks.

14. The vehicle seat assembly of claim 13, wherein the second pivoting arm is mounted pivoting around a second axis of rotation, where the second axis of rotation is parallel to the longitudinal direction of the tracks.

15. The vehicle seat assembly of claim 13, wherein the first pivoting arm is mounted pivoting around the first axis of rotation, where the first axis of rotation is parallel to the longitudinal direction of the tracks.

* * * * *